INVENTOR.
Georg Ornstein
BY Frederich E. Hahn
ATTORNEY

Fig. 4

Patented May 28, 1946

2,401,012

UNITED STATES PATENT OFFICE 2,401,012

APPARATUS FOR APPLYING TREATING MEDIUMS

Georg Ornstein, New York, N. Y.

Application May 1, 1942, Serial No. 441,261

14 Claims. (Cl. 210—28)

My invention relates to apparatus for supplying a treating medium, preferably a treating gas at a controlled rate, and more especially to an apparatus for supplying chlorine or sulphur dioxide gas at a controlled and measured rate to a flowing medium such as water, for instance water of cities, or sewage.

In the treating of water with chlorine or any other suitable treating gas, the chlorine is fed into the stream of water to be treated, preferably in the form of aqueous solution. In order to know the amount of chlorine being supplied, the rate of supply of chlorine must be accurately controlled and measured. Various methods of control are known. One which is widely known and has been preferably used in chlorine-controlled apparatus is to pass the gas through a flow-controlling orifice thereby causing a drop of pressure and to control the rate of flow of the gas by varying the drop of pressure across the orifice.

One type of apparatus based on this method of control comprises a container into which gas is admitted, means for withdrawing gas after it has passed through the flow-controlling orifice, and means for controlling the pressure drop.

A main object of my invention is to provide in combination with apparatus of this type means for controlling the pressure of gas before the orifice which I hereinafter call the pressure of gas on the "upstream side of the orifice." The gas pressure behind the orifice, which I hereinafter call the gas pressure on the "downstream side of the orifice," may or may not be held constant. I found that the control of the gas pressure on the upstream side of the orifice permits an accurate regulation of the gas flow by very simple and reliable means.

Another object of my invention is to provide means for counterbalancing the effect of other means for controlling the gas pressure on the upstream side of the orifice at least partly and to make these counterbalancing means adjustable.

Another object of my invention is to provide means comprising a liquid column for controlling the gas pressure on the upstream side of the orifice, and a second adjustable liquid column for counterbalancing the first liquid column, at least partly.

Another object of my invention is to provide means for automatically controlling the admission of liquid employed for maintaining said liquid columns.

Another object of my invention is to provide means for preventing any flow of liquid in which treating gas is or may be dissolved from a closed part of the apparatus into the open where it may produce unpleasant odors.

Other and further objects of my invention will hereinafter be set forth and the novel features thereof defined by the appended claims.

In the accompanying drawings several embodiments of my invention are shown.

Fig. 4 is a sectional view of still another embodiment of a chlorinator according to my invention.

Figure 1:
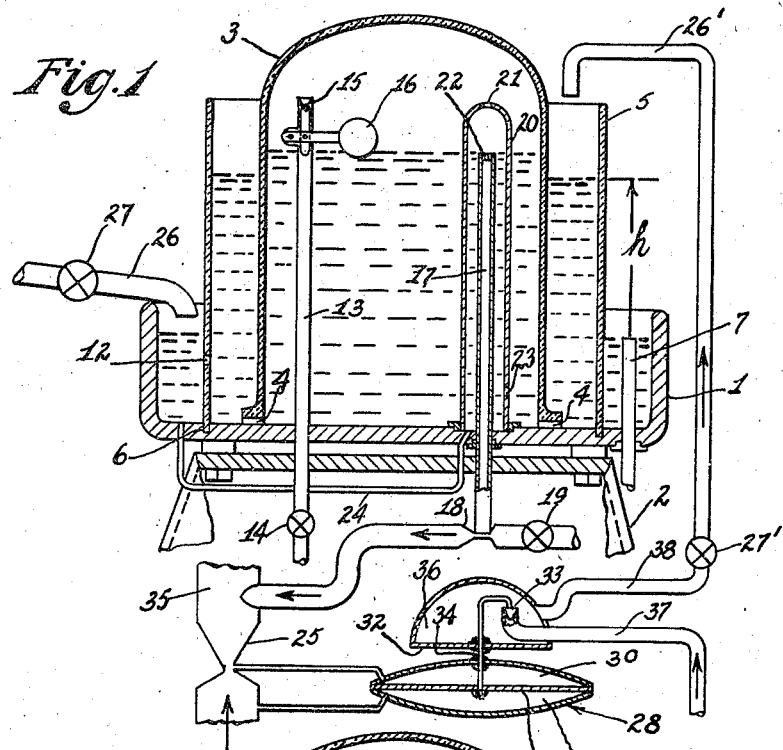
Fig. 1 is a sectional view of a chlorinator according to my invention.

The chlorinator shown in Fig. 1 comprises a tray or open receptacle 1 made of any suitable material, for instance hard rubber. It is supported by a standard 2 of conventional design. In the tray a container such as a bell jar 3 preferably made of transparent material, for instance glass, is placed. At the lower edge of bell jar 3, channels or vents 4 are provided to permit a flow of a liquid, such as water, into the bell jar and out of it. The bell jar is surrounded by a second container 5, for instance a glass cylinder, whereby an annular space, preferably about 1 to 2 inches wide, is formed. Vents 4 serve as communications between the inside of bell jar 3 and the annular space formed by cylinder 5. Cylinder 5 is sealed to the bottom of tray 1, for instance by inserting it into a circular groove 6. Water is admitted into tray 1 by a pipe 26. The flow of water through pipe 26 can be regulated by a valve 27 of conventional design. The body of water is maintained at a predetermined level, preferably by means of an overflow tube 7. Cylinder 5 communicates with tray 1 and the liquid in it by means of one or more small openings 12 which are provided slightly below the level of the water in tray 1 as controlled by overflow 7. The treating gas, for example chlorine, is admitted into bell jar 3 through a pipe 13 which is controlled by a conventional valve 14. Pipe 13 is provided at its top with a float valve 15 made of any suitable material, for example silver, and having a float 16. The float valve is disposed in such a position within the bell jar that it will open and admit fresh chlorine gas only when the water in bell jar 3 is sucked up to about ¾ of the height of bell jar 3. If the water sinks below this level, float valve 15 will close again. By this means a constant water level is maintained inside bell jar 3 irrespective of the levels of water in cylinder 5 and tray 1 and a constant flow of chlorine gas assured.

Passing up through the bottom of tray 1 is a pipe 17 which communicates with the throat of an aspirator or injector 18. This injector may be controlled by a valve 19 in a conventional manner. A current of liquid, for instance water, is flowing through injector 18 and produces the necessary suction power. Pipe 17 is surrounded by a tube 20 which is provided at its upper end with an orifice 21. The inside diameter of pipe 17 is preferably so far reduced at its top 22 or at any other suitable point that it is only slightly larger than the cross-section of the diameter of orifice 21. This restriction of pipe 17 will reduce the amount of water aspirated through pipe 17 without affecting the volume of chlorine sucked into the orifice tube. One or more openings 23 are provided in the orifice tube close to the bottom of tray 1 which serve as communication between the interior of bell jar 3 and the interior of orifice tube 20. Instead of admitting liquid into orifice tube 20 by means of openings or vents 4 and 23 it is also possible to use a pipe 24 connecting the interior of orifice tube 20 directly with the body of water in the tray outside of cylinder 5.

Water is admitted into cylinder 5 by a pipe 26'. The flow of water through pipe 26' can be regulated by a valve 27' of conventional design. In order to control the admission of water into cylinder 5 automatically a controlling device of known design can be employed. The controlling device shown in Fig. 1 comprises a chamber 28 which is partitioned by a diaphragm 29 into two chambers 30 and 31. Chamber 30 communicates with the throat of a Venturi tube 25 included in the main 35 and chamber 31 with the inlet side of Venturi tube 25 (main 35 is shown on a greatly reduced scale). Diaphragm 29 is connected with the diaphragm 32 of a second diaphragm chamber 36 by means of a rigid stem 34 which also controls a valve 33 regulating the admission of water into chamber 36. Consequently all movements of one diaphragm are transmitted to the other diaphragm. The current of water flowing into cylinder 5 through pipe 26' and controlled by valve 27' is conducted through chamber 36 by means of pipes 37 and 38. Hence the pressure in chamber 36 will depend on the flow of water through pipe 26'. The pressure in chamber 31 will be substantially constant and at all times be equal to the pressure in the main, but the pressure in the throat of Venturi tube 25 will vary corresponding to the rate of flow of water flowing through main 35. A decrease of the pressure in the throat of Venturi tube 25 will reduce the pressure in chamber 30. Consequently diaphragm 29 and with it stem 34 will be moved upward. This will result in a wider opening of valve 33 and causes an increase of pressure in chamber 36. Thus the pressure exerted upon diaphragm 32 will be increased. This pressure will be transmitted to diaphragm 29 through stem 34 and counterbalance the pressure exerted upon diaphragm 29. The reaction of the controlling device will of course be effected by the adjustment of valve 27'. Therefore the cooperation of the various elements of the controlling device will secure an automatic regulation of the admission of water into cylinder 5.

As long as no water is flowing from pipe 26' into cylinder 5 the water level in this cylinder will be equal to the water level in tray 1 outside of cylinder 5. This water level in turn will be determined by the overflow tube 7. The water level within bell jar 3 is controlled by float valve 15. The water level within orifice tube 20 is controlled by the upper edge of discharge pipe 17 and should preferably be the same as in bell jar 3. The negative pressure on the upstream side of the orifice is substantially equal to the negative pressure on the downstream side of the orifice. Hence there is no pressure drop across the orifice and consequently no flow of chlorine through discharge pipe 17. Assuming that a regulated flow of water is admitted into cylinder 5 a certain level of water will adjust itself within cylinder 5. This level is a function of the amount of water admitted into cylinder 5 and of the outflow through opening 12. The water within orifice tube 20 is supplied through by-pass line 24. The column of water built up in cylinder 5 counterbalances the column of water within the bell jar to a certain extent, thus reducing the negative head on the upstream side of the orifice, the negative head on the downstream side remaining constant. Consequently the pressure on the upstream side is less negative. Injector 18 will begin to draw chlorine through orifice 21 and a solution of chlorine and water will be discharged into the stream of liquid flowing through injector 18. Chlorine now flows through orifice 21 at a ratio proportional to the square root of the difference between the water level in cylinder 5 and the water level in tray 1. The more the water level in cylinder 5 approaches the water level in bell jar 3, the more the pressure on the upstream side of orifice 21 approaches atmospheric pressure. Since the negative head on the downstream side of the orifice remains constant, the drop of pressure across the orifice and hence the flow of chlorine through the orifice will increase. When the level of liquid within cylinder 5 becomes equal to the level of liquid within bell jar 3, the gas pressure within the bell jar is equal to the atmospheric pressure and the flow of chlorine through the orifice will reach its maximum.

Consequently, the height $h$ indicates the rate of flow at which gas is withdrawn from the bell jar and fed into the stream of water flowing through injector 18. A calibration to indicate the rate at which gas is withdrawn can be provided on the wall of cylinder 5 or be connected with it.

The previously described apparatus lends itself to a simple automatic regulation of the admission of chlorine in direct proportion to the rate of water to be treated. The controlling device controlled by main 35 will automatically regulate the rate of water flowing through pipe 26' into cylinder 5.

Figure 2:
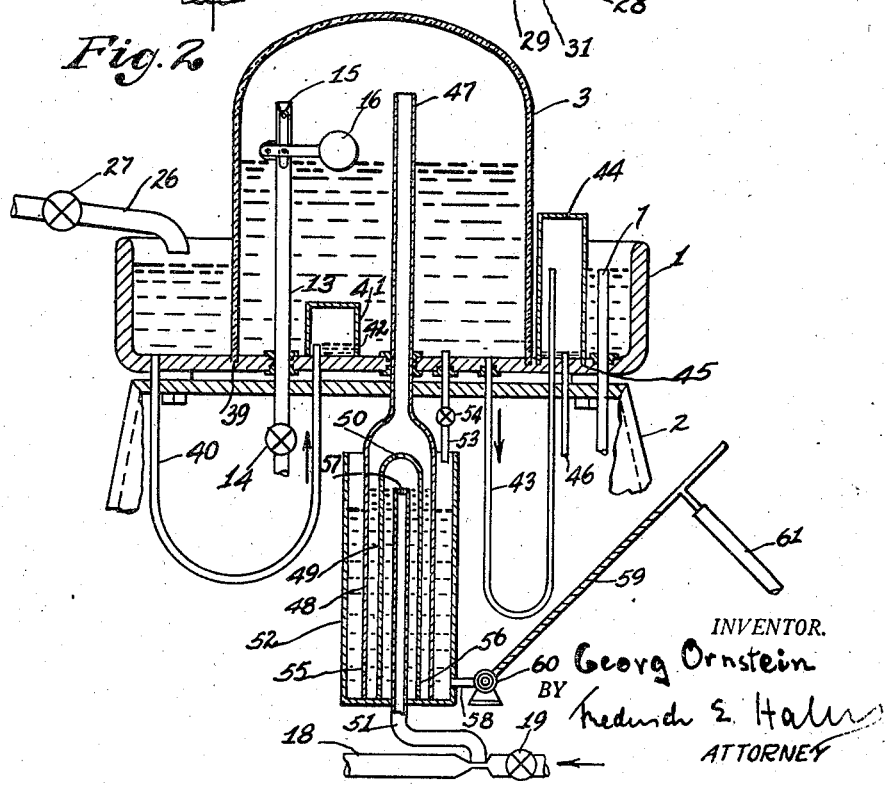
Fig. 2 is a sectional view of a second embodiment of a chlorinator according to my invention.

Fig. 2 of the drawings shows an embodiment which permits a very accurate recording and controlling of the admission of chlorine gas.

The same numerals designate the same elements as shown in Fig. 1.

In the embodiment shown in Fig. 2 bell jar 3 is placed tightly on the bottom of tray 1, for instance by inserting it into a circular groove 39, provided in the bottom of tray 1. A pipe 40 serves to admit water from the body of water in tray 1 into bell jar 3. The outer end of pipe 40 may be flush with the bottom of tray 1. This inner end is covered by a closed container 41 which is provided with one or more openings 42 below the level of the end of pipe 40. This arrangement serves as a liquid seal permitting the flow of water from tray 1 through pipe 40 into bell jar 3 and preventing a flow of liquid in the opposite direction. The discharge of water from the bell jar when the apparatus is to be shut down is controlled by a second liquid seal. This seal comprises a U-shaped pipe 43 which connects bell jar 3 with a container 44. This container is placed tightly on the bottom of tray 1, for instance by inserting it into a circular groove 45 provided in the bottom. Pipe 43 shall end within container 44, preferably on the same level as overflow 7. A second tube 46 serves to discharge water from container 44 into waste. It is easily understandable that the liquid seal permits a flow of water in the direction indicated by an arrow only. The use of liquid seals instead of vents or channels connecting the bell jar directly with the body of water in the outer tray has the advantage that any escape of chlorine or other treating gas from the bell jar is prevented. When liquid is permitted to flow from the bell jar back into the tray, minute quantities of chlorine dissolved in the liquid within the bell jar will escape from the bell jar. Such minute quantities of chlorine are not dangerous but produce an unpleasant odor.

The chlorine is withdrawn from the bell jar through a pipe 47 the top of which ends above the level of the liquid within the bell jar as controlled by float valve 15. The lower end of pipe 47 is widened to form a cylinder 48. Within this cylinder is disposed an orifice tube 49 having an orifice 50 at its top. Orifice tube 49 encompasses a pipe 51 serving to discharge chlorine drawn through orifice 50 and water entering at the bottom of orifice tube 49. Pipe 51 communicates with the throat of injector 18. Cylinder 48 is placed in a second cylinder 52, open at the top. Water is admitted into cylinder 52 by means of a tap or spigot 53. The flow of water through this spigot may be controlled by a valve 54 of conventional design. One or more openings 55 close to the bottom of cylinder 48 connect cylinder 52 with the interior of cylinder 48. This cylinder is in turn connected by similar openings or vents 56 with orifice tube 49. Consequently, water admitted through tap 53 into cylinder 52 will enter the orifice tube and be aspirated through discharge pipe 51. The inside diameter at the top 57 of this pipe or at any other suitable point of its length is preferably so far reduced that it is only slightly larger than the diameter of orifice 50. Outer cylinder 52 is connected by an intermediate pipe 58 with a tube 59 which is pivotal about pivot point 60 to permit angular adjustment of pipe 59. Pipe 59 is connected with waste by a flexible tube 61, for example a rubber hose.

The operation of the apparatus is as follows:

Assuming a current of liquid is flowing through injector 18 and water is admitted into tray 1 through pipe 26, then water will be sucked up within bell jar 3 until it reaches a substantially constant level controlled by chlorine float valve 15. Chlorine is aspirated through pipe 47 and orifice 50 from bell jar 3, and discharged through pipe 51 together with water entering this pipe. As explained in connection with Fig. 1, the negative head on the downstream side of orifice 50 remains substantially constant and is equal to the column of liquid between the openings 56 and 57. The amount of chlorine which is drawn through orifice 50 will depend on the difference between the water level within cylinder 48 and the water level in outer cylinder 52. The water level within the orifice tube is determined by the upper edge of discharge pipe 51. The water level in outer cylinder 52 is determined by the position of the overflow level of tiltable tube 59. As has been explained in connection with Fig. 1 the water column in cylinder 52 which corresponds to the water column in cylinder 5 in Fig. 1, counterbalances the water columns in cylinder 48 and in bell jar 3 respectively. The lower the water in cylinder 52, the less will be the difference between the negative head on the upstream side of orifice 50 and on the downstream side of the orifice, until finally the pressure on the upstream side of orifice 50 becomes equal to the pressure on the downstream side at the level of the openings 55 which should be located slightly higher than the openings 56. Then no chlorine will be drawn through orifice 50. On the other hand, when the water column in cylinder 52 reaches the level of the water column in cylinder 48 the pressure on the upstream side of orifice 50 will be equal to atmospheric pressure and the pressure drop over orifice 50 will reach a maximum, the negative pressure on the downstream side of the orifice remaining constant.

The adjustable tube 59 affords a simple means for controlling the water level within cylinder 52. Since cylinder 52 and tube 59 form communicating tubes the water level within cylinder 52 and with it the volume of gas drawn through orifice 50 can be regulated by the simple expedient of adjusting the angular position of the tube 59. A reading scale can be associated with tube 59 or with cylinder 52, which can be calibrated, for instance, to read in pounds of chlorine per a time unit.

It is obvious from Fig. 2 and the previous description that the large cylinder 5 surrounding bell jar 3 is substituted by the small cylinder 52 surrounding the cylindrical extension 48 of pipe 47 and that the water column in cylinder 48 which is to be counterbalanced by the water column in cylinder 52 corresponds to the water column in bell jar 3. The design illustrated in Fig. 2 permits a large reduction in size as compared with the design shown in Fig. 1 with a corresponding reduction of the volume of water in the annular space between 52 and 48. The response of the chlorine flow after each new adjustment is accelerated correspondingly. The current of water to be fed into the annular space surrounding the pressure-determining column can be taken from the tray directly where it is available under a definite, constant head, thus making superfluous special controlling devices.

Figure 3:
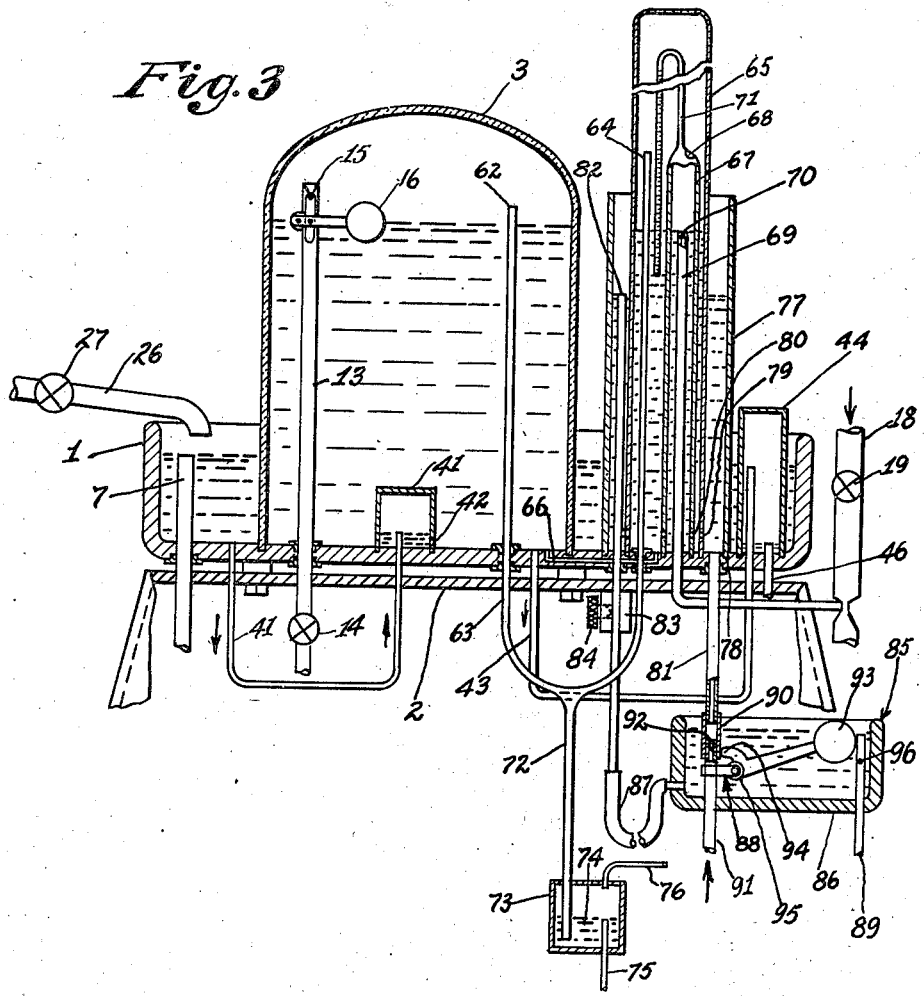
Fig. 3 is a sectional view of a third embodiment of a chlorinator according to my invention.

In the embodiment shown in Fig. 3, the same numerals designate the same elements as in the previously described figures. The chlorine gas is withdrawn from bell jar 3 through a U-shaped tube 62. Leg 63 of this U-shaped tube is located within bell jar 3 and ends above the liquid level within the bell jar as controlled by float valve 15. The other leg 64 ends within a second container, for example a bell jar 65 which is placed in tray 1. Within bell jar 65 an orifice tube 67 with its orifice 68 is provided. The orifice tube encompasses a pipe 69 through which chlorine drawn through orifice 68 and water entering pipe 69 are discharged. As previously described, discharge pipe 69 is connected with the throat of injector 18. The inner diameter of pipe 69 at its top 70 or at any suitable point of its length is preferably so far reduced that it is only slightly larger than the diameter of orifice 68 as thereby the amount of water aspirated together with the gas is reduced. In order to measure the differential head between upstream and downstream side of orifice 68, a U-shaped manometer 71 indicating the pressure difference upstream and downstream of the orifice may be provided. Leg 64 of U-shaped tube ends above the level of liquid within bell jar 65, as determined by the upper edge of discharge pipe 69. The water in bell jar 65 communicates with the water in bell jar 3 through a conduit 66. The knee of U-shaped tube 62 is continued into a pipe 72 which is connected with a liquid trap comprising a closed container filled with a suitable liquid 74, for example water and a discharge tube 75 leading to waste. The container may also be provided with a vent 76. The liquid trap serves to discharge any water accidentally entering tube 62, to prevent the U tube from becoming watersealed.

Bell jar 65 is surrounded by a cylinder 77, which is sealed to the bottom of tray 1, for instance by inserting it into a circular groove 78. Cylinder 77 serves to form an annular space surrounding bell jar 65. It communicates with the interior of bell jar 65 through one or more vents or channels 79 provided near its bottom. Bell jar 65 is connected with orifice tube 67 through one or more vents or channels 80 on the same or preferably slightly lower level. Water is admitted into cylinder 77 by a pipe 81. The liquid level in cylinder 77 is controlled by an adjustable overflow tube 82. This overflow can be made adjustable by any suitable means for example by arranging it vertically adjustable as shown in Fig. 3. Overflow tube 82 is slidably passed through the bottom of tray 1 and supported by a bracket 83 which is preferably attached to standard 2. By means of a set screw 84 tube 82 can be secured in any desired position.

The admission of water into cylinder 77 is regulated by a controlling device 85. This device comprises an open container, for example an open tray 86, into which overflow tube 82 discharges. Tube 82 is preferably connected with tray 86 through a flexible tube 87, for example a rubber hose, in order to permit a vertical adjustment of the overflow. A float valve 88 controls the flow of water through pipe 81. Float valve 88 comprises an elastic tube 90, for example a section of rubber hose, which connects pipe 81 with a pipe 91 communicating with the supply of water. Near the upper end of pipe 91 are provided one or more openings 92, which are covered by rubber hose 90. The pressure of water flowing through pipe 91 in the direction indicated by an arrow will tend to press the rubber hose 90 away from openings 92 permitting the flow of water from pipe 91 into pipe 81. The amount of water which can pass through openings 92 is controlled by a float 93. This float is secured to a thumb or arm 94 which is pivotally supported by a bracket 95. It is obvious from the drawing that the higher the level of liquid is in tray 86 the stronger thumb 94 will press against hose 90. As a result, the flow of water through openings 92 will be diminished or cut off entirely. The water level in tray 86 is limited by an overflow tube 89. One or more small openings 96 or slots are provided in tube 89 so that the water in tray 86 can sink below the maximum level as controlled by tube 89. This secures a continuous flow of water through pipe 81. Without such provisions a condition of equilibrium may be reached in which the float valve closes openings 92 tight enough to prevent an admission of water into cylinder 77. Instead of using small openings or slots, the float valve may also be adjusted in such a manner that it will remain slightly open when the liquid in tray 86 reaches the overflow level.

Instead of a controlling device as shown in Fig. 3, any other control device of conventional design may be used for controlling the admission of liquid into the annular space surrounding bell jar 65, for example, it would be possible to use the controlling device shown and described in connection with Fig. 1.

It is obvious from the drawings and the previous description that a substantially constant negative head will be built up on the downstream side of orifice 68. The water levels within bell jar 65 and orifice tube 67 are preferably equal to the water level within bell jar 3. The water column within cylinder 77 is corresponding to the water column in cylinder 52 of Fig. 2. Consequently, the pressure of the chlorine gas on the upstream side of orifice 68 and with it the pressure drop across the orifice 68 will be controlled by the level of the water column within cylinder 77 which counterbalances the water column within bell jar 65. The lower the water column within cylinder 77, the smaller will be the pressure drop across orifice 68. If the level of the water column within cylinder 77 is equal to the level within tray 1, there will be no pressure difference between the upstream side and the downstream side of orifice 68. No chlorine will be drawn through the orifice. On the other hand, when the level within cylinder 77 is equal to the level within bell jar 65 the pressure on the upstream side of orifice 68 will equal atmospheric pressure. The pressure drop across the orifice and hence the flow of chlorine through the orifice will reach a maximum.

The level of the water column within cylinder 77 will be controlled by the adjustment of overflow tube 82 thus regulating the pressure on the upstream side of orifice 68.

Figure 4:
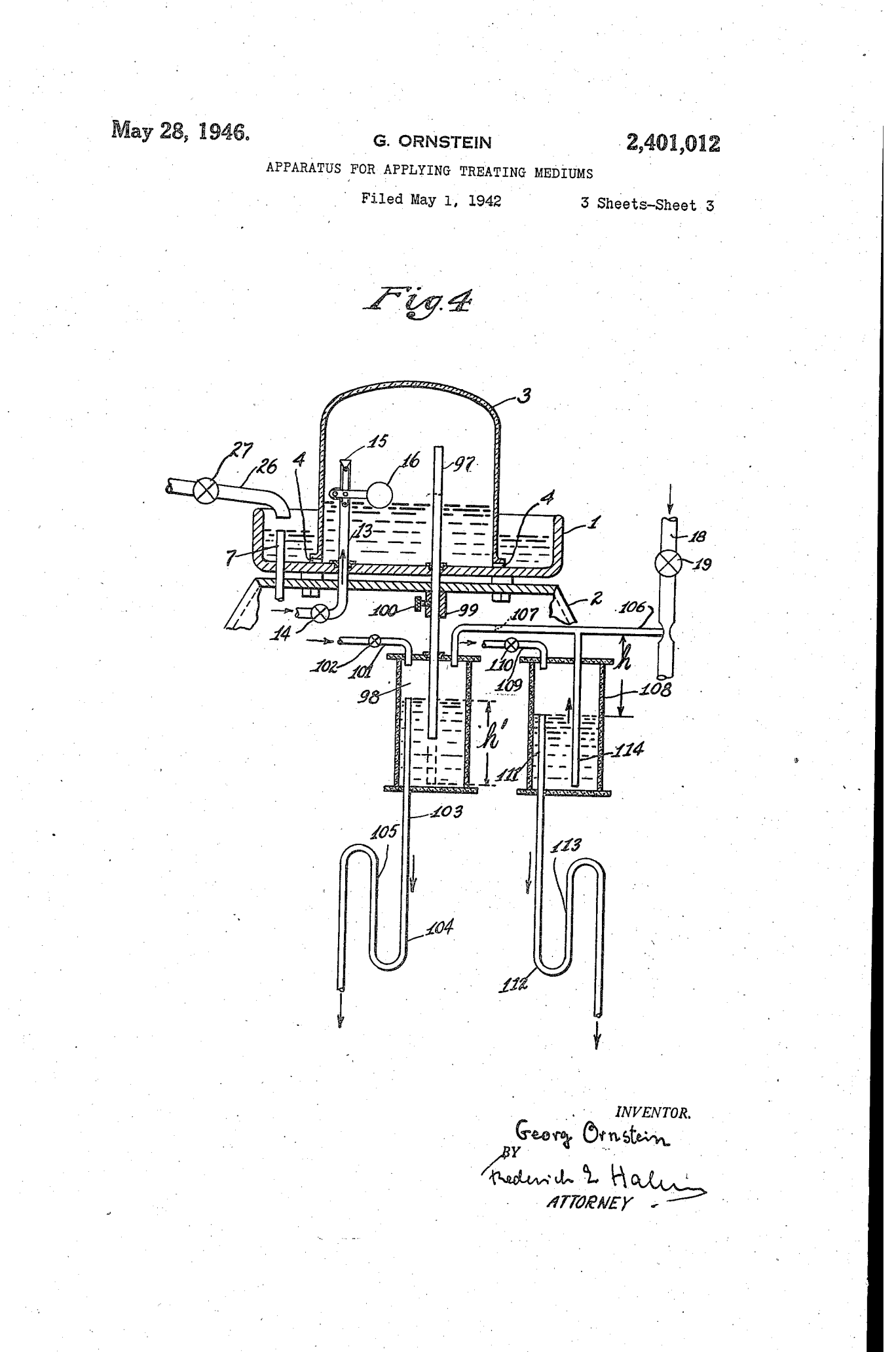

In Fig. 4 the same numerals designate the same elements of the chlorinator.

A pipe 97 serves to discharge chlorine from bell jar 3. This pipe connects bell jar 3 with a closed receptacle 98 made of any suitable material for instance a glass cylinder with hard rubber flanges. In this receptacle a body of liquid, for example water is maintained. Discharge pipe 97 is vertically adjustable in order to vary the discharge or submergence level of pipe 97 within receptacle 98. The vertical adjustment of pipe 97 can be obtained by passing it slidably through the bottom of tray 1 and a bracket 99 secured to frame 2. By means of a set screw 100 pipe 97 can be secured in any desired vertical position. Of course it is also possible to vary the discharge level of pipe 97 as described for pipe 59 in connection with Fig. 2. In order to maintain a constant level of liquid within receptacle 98 a tap 101, controlled by a valve 102 of conventional design, is provided. This tap serves to replace any lost water. The maximum liquid level in receptacle 98 is determined by an overflow tube 103. In this overflow tube a trap 104 is included. The straight section 105 of this trap should be longer than the maximum liquid column in receptacle 98 in order to prevent air being sucked in by the negative pressure prevailing in receptacle 98 or the escape of chlorine gas from receptacle 98.

As is obvious from Fig. 4, chlorine admitted into bell jar 3 through pipe 13 which is controlled by float valve 15 will be conveyed through pipe 97 into receptacle 98 and bubble through the liquid in this receptacle into the space above the liquid. Chlorine is discharged from receptacle 98 through a pipe 106 in which a flow controlling orifice 107 is included. Pipe 106 is connected with an injector 18. This injector in turn communicates with the medium to be treated. The auxiliary liquid, for example water, which acts as make-up water to satisfy that part of the injector suction which is not met by the amount of chlorine aspirated is withdrawn from a body of liquid maintained in a second receptacle 108. Auxiliary water is admitted into receptacle 108 by a pipe 109. The flow of water through this pipe is controlled by a valve 110 of conventional design. The liquid level in receptacle 108 is maintained constant by an overflow 111 in which a liquid trap 112 is included. The straight section 113 of this liquid trap shall be long enough to prevent the escape of gas from receptacle 108 or the aspiration of air into receptacle 108 namely larger than the distance $h$ indicated in receptacle 108. A conduit 114 connects the liquid in receptacle 108 with conduit 106 at a point on the downstream side of orifice 107.

The length of conduit 114 between the level of liquid in receptacle 108 and the pipe 106 shall be the same or slightly less than the column of liquid over the discharge level of pipe 97 when this pipe is in its lowest position within receptacle 98. This position is indicated by dotted lines. In other words, $h$ shall be equal or slightly less than $h'$.

The operation of the apparatus is as follows: When chlorine is drawn by the injector suction through pipe 13 into bell jar 3 a certain constant negative pressure of chlorine will be built up in bell jar 3. Chlorine will be conveyed through pipe 97 into receptacle 98 and withdrawn from this receptacle by the negative head produced on the downstream side of orifice 107 by the suction device. The flow rate of chlorine gas will depend on the pressure drop across orifice 107. While the negative head on the downstream side remains substantially constant, the pressure on the upstream side will depend on the column of water which the chlorine has to overcome when flowing through pipe 97. The deeper pipe 97 extends into the liquid within receptacle 98, the less chlorine will be drawn through orifice 107. When pipe 97 is in its lowest position the pressure on the upstream side will be substantially equal to the pressure on the downstream side and no chlorine will be drawn through orifice 107. On the other hand when the discharge level of pipe 97 is in its highest position, for example above the liquid level in receptacle 98, the flow of chlorine gas will reach its maximum. The suction device connected with the pipe 106 will also aspirate liquid namely through conduit 114 from receptacle 108. This liquid will be mixed with the chlorine gas flowing through pipe 106 and conveyed into the injector connected with pipe 106.

I do not want my invention to be limited to the embodiments shown in the drawings and described herein, as various changes can be made without departing from the scope of my invention.

Having described my invention, what I claim as new and desire to secure by Letters Patent is:

1. In an apparatus for supplying a sterilizing gas to a liquid to be sterilized in combination a closed container, valve means for admitting said gas into said container at a controlled pressure and capable of maintaining the head of the gas in the container at a predetermined substantially constant value during operation, means for withdrawing gas from said container and feeding it into said liquid to be sterilized, said latter means comprising a member providing a flow-controlling orifice having an upstream side and a downstream side and a suction device for drawing gas through said flow-controlling orifice, and hydraulic means for regulating during operation the predetermined value at which the head of gas is held constant by the valve means corresponding to the desired rate of flow of the gas.

2. In an apparatus for supplying a sterilizing gas to a liquid to be sterilized in combination a closed container, valve means for admitting said gas into said container at a controlled pressure, means for withdrawing gas from said container and feeding it into said liquid to be sterilized, said latter means comprising a member providing a flow-controlling orifice having an upstream side and a downstream side and a suction device for drawing gas through said flow-controlling orifice, and means for controlling the flow of gas through said orifice, said control means comprising means for maintaining a constant pressure of said gas on the upstream side of said flow-controlling orifice during operation, hydraulic means for counterbalancing said pressure at least partly, and means for regulating said counterbalancing means during operation.

3. In an apparatus for supplying sterilizing gas to a liquid to be sterilized in combination a tray in which is maintained a body of liquid at a substantially constant level; means for supplying said liquid; a closed container; means connecting said tray with said container; valve means for admitting said gas into said container at a controlled pressure; means for withdrawing said gas and said liquid from said container and for feeding them into said liquid to be sterilized, said latter means comprising a tubular member containing a flow-controlling orifice having an upstream side and a downstream side, and an opening for admitting liquid into the tubular member at the downstream side of the orifice, a suction device for drawing gas through said flow-controlling orifice and for aspirating liquid, and a member for feeding said gas drawn through said orifice and liquid aspirated by said suction device into said liquid to be sterilized; means for controlling the flow of gas through said orifice, said controlling means comprising a column of liquid maintained in said closed container and in said tubular member at a level above the level of the liquid in the tray for maintaining a certain pressure of said gas on the upstream side of said orifice; an open container in which a second column of liquid is maintained for counterbalancing said first column at least partly; conduit means between the containers for admitting the flow of liquid from one container to the other; and means for regulating and maintaining during operation the level of said second liquid column at any desired level between the level of the liquid in the tray and in the tubular member.

4. In an apparatus for supplying sterilizing gas to a liquid to be sterilized in combination a tray in which a body of liquid is maintained at a substantially constant level, means for supplying said liquid, a closed container, means connecting said tray with said container and admitting liquid from said tray into said container, valve means for admitting said gas into said container at a controlled pressure, and for maintaining the head of said gas within said container substantially constant during operation by maintaining the level of liquid within said container substantially constant, means for withdrawing said gas and for aspirating liquid from said container and for feeding them into said liquid to be sterilized, said latter means comprising a tube extending below the level of the liquid in said container and having an opening near the bottom and a flow-controlling orifice, a suction device for drawing gas through said flow-controlling orifice and for aspirating liquid from said liquid in said container and a member extending into said orifice tube for feeding said gas drawn through said orifice and said aspirated liquid into said liquid to be sterilized, a second container in which a column of liquid is maitained at a level above the level of the liquid in the tray and below the level of the liquid in the closed container, conduits connecting said second container with the liquid in said first container and means for varying the level of the liquid in said second container.

5. In an apparatus for supplying sterilizing gas to a liquid to be sterilized in combination a tray, in which a body of liquid is maintained, means for supplying said liquid, a closed container placed in said tray, means connecting said tray with said container and admitting liquid from said tray into said container, an open second container encompassing said first container placed in said tray, said second container communicating with said first container and said tray, means for admitting liquid into said second container, valve means for admitting said gas into said first container and controlling its pressure by maintaining a substantially constant level of liquid in said first container, means for withdrawing gas and liquid from said first container and for feeding them into said liquid to be sterilized, said means comprising a tube extending below the level of liquid in said first container and having an opening near the bottom and a flow-controlling orifice, a suction device for drawing gas through said flow-controlling orifice and for aspirating liquid from said first container, a second tube disposed within said orifice tube for feeding said gas drawn through said orifice and liquid aspirated by said suction device from said first container into said liquid to be sterilized and means for controlling the liquid level in said second container to counterbalance said liquid in said first container at least partly.

6. An apparatus for supplying sterilizing gas to a liquid to be sterilized as described in claim 5 in which said means for controlling the liquid level in said second container comprise means for automatically regulating the admission of liquid into said second container, said regulating means being controlled by the rate of flow of the liquid to be sterilized.

7. In an apparatus for supplying sterilizing gas to a liquid to be sterilized in combination a tray in which a body of liquid is maintained, means for supplying said liquid, a closed container placed in said tray and communicating with said tray, means for admitting said gas into said container, valve means for controlling the pressure of said gas into said container by maintaining a substantially constant level of liquid in said container, means for withdrawing said gas and liquid from said container and feeding them into said liquid to be sterilized, said latter means comprising a tube and having an opening near the bottom and a flow-controlling orifice, a second tube surrounding said orifice tube in which second tube a body of liquid is maintained and into which said orifice tube extends, a conduit admitting said gas from said container into said second tube, a suction device for drawing gas through said flow-controlling orifice and for aspirating liquid from said second tube, a third tube disposed within said orifice tube for feeding gas drawn through said orifice tube and liquid aspirated by said suction device into said liquid to be sterilized, an open container in which a body of liquid is maintained encompassing said second tube and communicating with it, means for admitting liquid from said open container into said closed container and means for varying the liquid level in said open container.

8. An apparatus for supplying a sterilizing gas to a liquid to be sterilized as described in claim 7 in which said means for controlling the liquid level in said second container comprise an adjustable overflow.

9. An apparatus for supplying a sterilizing gas to a liquid to be sterilized in combination, a tray in which a body of liquid is maintained, means for supplying said liquid, a closed container placed in said tray, a conduit for discharging liquid from said tray into said container, a liquid seal included in said conduit open for the flow of liquid only in the direction from said tray into said container, a second conduit for discharging liquid from said container into waste, a second liquid seal included in said second conduit open for the flow of liquid only in the direction from said container into waste, means for admitting said gas into said container at a controlled pressure, means for withdrawing said gas and liquid from said container and for feeding them into said liquid to be sterilized, said latter means comprising a member providing a flow-controlling orifice having an upstream side and a downstream side, a suction device for drawing said gas through said flow-controlling orifice and for aspirating liquid and a member for feeding said gas drawn through said orifice and said liquid aspirated by said suction device into said liquid to be sterilized, and means for controlling the flow of said gas through said orifice, said controlling means including means for maintaining a certain pressure of the gas on the upstream side of said flow-controlling orifice and means for varying said pressure.

10. An apparatus for supplying sterilizing gas to a liquid to be sterilized in combination a tray in which a body of liquid is maintained, means for supplying said liquid, a closed container, a conduit connecting said tray with said container, a liquid seal included in said conduit open for the flow of liquid only in the direction from said tray into said container, said seal comprising a closed receptacle provided within said container into which receptacle said conduit discharges and which communicates with the container at a level lower than the discharge level of said conduit, a second conduit for discharging liquid from said container into waste, a second liquid seal included in said second conduit open for the flow of liquid only in the direction from said container into waste, said second seal comprising a closed receptacle into which said second conduit discharges and which is connected with waste at a level lower than the discharge level of said second conduit, means for admitting said gas into said container at a controlled pressure, means for withdrawing said gas and liquid from said container and for feeding them into said liquid to be sterilized, said latter means comprising a member providing a flow-controlling orifice having an upstream side and a downstream side, a suction device for drawing gas through said flow-controlling orifice and for aspirating liquid and a member for feeding said gas drawn through said orifice and said liquid aspirated by said suction device into said liquid to be sterilized, and means for controlling the flow of said gas through said orifice, said controlling means including means for maintaining a certain pressure of said gas on the upstream side of said flow-controlling orifice, hydraulic means for counterbalancing said pressure at least partly, and means for regulating said counterbalancing means.

11. In an apparatus for supplying a sterilizing gas to liquid to be sterilized in combination, a closed container, means for admitting said gas into said container, valve means for controlling the admission of said gas into said container, a closed receptacle in which a body of liquid is maintained at a substantially constant level, means for maintaining said body of liquid, a conduit connecting said container with said receptacle for conveying said gas from said container into said receptacle, means for adjusting the discharge level of said conduit within said receptacle, a second conduit for conveying said gas from said receptacle into said liquid to be sterilized, a member providing a flow-controlling orifice having an upstream side and a downstream side included in said second conduit and a suction device connected with said second conduit for drawing said gas through said flow-controlling orifice by causing a substantially constant negative pressure on the downstream side of the orifice.

12. In an apparatus for supplying a sterilizing gas to a liquid to be sterilized in combination, a closed container, means for admitting said gas into said container, valve means for controlling the admission of said gas into said container, a closed receptacle in which a body of liquid is maintained at a substantially constant level, means for maintaining said body of liquid, a conduit connecting said container with said receptacle for conveying said gas from said container into said receptacle, means for adjusting the discharge level of said conduit within said receptacle, a second conduit for conveying said gas from said receptacle into said liquid to be sterilized, a member providing a flow-controlling orifice having an upstream side and a downstream side included in said second conduit, a second container in which a supply of liquid is maintained, a third conduit connecting said supply of liquid with said second conduit for conveying said gas at a point of the second conduit on the downstream side of the flow-controlling orifice and a suction device for drawing said gas through said flow-controlling orifice and for aspirating liquid through said second conduit and for feeding them into said liquid to be sterilized by causing a substantially constant negative pressure on the downstream side of the orifice.

13. In an apparatus for supplying a sterilizing gas to a liquid to be sterilized in combination, a closed container, means for admitting said gas into said container, valve means for controlling the admission of said gas into said container, a closed receptacle in which a body of liquid is maintained at a substantially constant level, means for maintaining said body of liquid, a conduit connecting said container with said receptacle for conveying said gas from said container into said receptacle, means for adjusting the discharge level of said conduit within said receptacle, a second conduit for conveying said gas from said receptacle into said liquid to be sterilized, a member providing a flow-controlling orifice having an upstream side and a downstream side included in said second conduit, a second receptacle in which a body of liquid is maintained at a substantially constant level, a third conduit for connecting the body of liquid in said second receptacle with said second conduit for conveying said gas at a point of the second conduit on the downstream side of the flow-controlling orifice, and a suction device for drawing said gas through said flow-controlling orifice and for aspirating liquid from said second receptacle and for feeding them into said liquid to be sterilized by causing a substantially constant negative pressure on the downstream side of the orifice.

14. In an apparatus for supplying sterilizing gas to a liquid to be sterilized in combination a tray in which is maintained a body of liquid at a substantially constant level; means for supplying said liquid; a closed container; means connecting said tray with said container for admitting liquid from said tray into said container; valve means for admitting said gas into said container at a controlled pressure, means for withdrawing said gas and said liquid from said container and for feeding them into said liquid to be sterilized; said latter means comprising a tubular member containing a flow-controlling orifice having an upstream side and a downstream side, a suction device for drawing gas through said flow-controlling orifice and for aspirating liquid, and a member for feeding said gas drawn through said orifice and liquid aspirated by said suction device into said liquid to be sterilized, said suction device being arranged to raise the level of the liquid in the closed container above the level of the liquid in the tray; an open container in which a column of liquid is maintained; means for supplying said last mentioned liquid; and means for regulating and maintaining during operation the level of the liquid in the open container at any desired leevl between the level of the liquid in the tray and in the closed container.

GEORG ORNSTEIN.